United States Patent
Hatscher et al.

(10) Patent No.: US 9,248,436 B2
(45) Date of Patent: Feb. 2, 2016

(54) HIGHLY ACTIVE SHIFT CATALYSTS

(75) Inventors: Stephan Hatscher, Syke (DE); Markus Hölzle, Kirchheim (DE); Thorsten von Fehren, Bürstadt (DE); Alexander Schäfer, Limburgerhof (DE)

(73) Assignee: BASF SE, Ludwigshafen (DE)

( * ) Notice: Subject to any disclaimer, the term of this patent is extended or adjusted under 35 U.S.C. 154(b) by 567 days.

(21) Appl. No.: 13/219,042

(22) Filed: Aug. 26, 2011

(65) Prior Publication Data

US 2012/0063989 A1  Mar. 15, 2012

Related U.S. Application Data

(60) Provisional application No. 61/377,107, filed on Aug. 26, 2010.

(51) Int. Cl.
| | |
|---|---|
| *C01B 31/20* | (2006.01) |
| *C01B 3/12* | (2006.01) |
| *C01B 3/16* | (2006.01) |
| *C01B 3/18* | (2006.01) |
| *B01J 20/00* | (2006.01) |
| *B01J 21/00* | (2006.01) |
| *B01J 21/04* | (2006.01) |
| *B01J 23/00* | (2006.01) |
| *B01J 23/02* | (2006.01) |
| *B01J 23/04* | (2006.01) |
| *B01J 23/06* | (2006.01) |
| *B01J 23/08* | (2006.01) |
| *B01J 23/10* | (2006.01) |

(Continued)

(52) U.S. Cl.
CPC ............ *B01J 23/8946* (2013.01); *B01J 21/066* (2013.01); *B01J 35/026* (2013.01); *B01J 37/0018* (2013.01); *B01J 37/0201* (2013.01); *B01J 37/0234* (2013.01)

(58) Field of Classification Search
USPC ......... 502/245, 252, 257, 261, 262, 302–304, 502/306–309, 314, 316–320, 327–346, 349, 502/355, 415, 439; 423/437.2, 655, 656
See application file for complete search history.

(56) References Cited

U.S. PATENT DOCUMENTS 3,649,707 A * 3/1972 Lester ............................ 585/487
3,670,037 A * 6/1972 Dugan .......................... 570/224
(Continued)

FOREIGN PATENT DOCUMENTS

| CN | 1280116 A | 1/2001 |
|---|---|---|
| CN | 1729141 A | 2/2006 |

(Continued)

OTHER PUBLICATIONS

International Search Report from PCT/IB2011/053729 dated Jan. 19, 2012.
(Continued)

*Primary Examiner* — Cam N. Nguyen
(74) *Attorney, Agent, or Firm* — Drinker Biddle & Reath LLP

(57) ABSTRACT

The present invention relates to a highly active water gas shift catalyst and a process for producing it, and also a process for converting a gas mixture comprising at least carbon monoxide and water into hydrogen and carbon dioxide in a wide temperature range using this catalyst.

16 Claims, 1 Drawing Sheet

(51) Int. Cl.
*B01J 23/40* (2006.01)
*B01J 23/42* (2006.01)
*B01J 23/44* (2006.01)
*B01J 23/56* (2006.01)
*B01J 23/58* (2006.01)
*B01J 23/60* (2006.01)
*B01J 23/70* (2006.01)
*B01J 23/72* (2006.01)
*B01J 23/74* (2006.01)
*B01J 23/89* (2006.01)
*B01J 21/06* (2006.01)
*B01J 35/02* (2006.01)
*B01J 37/00* (2006.01)
*B01J 37/02* (2006.01)

(56) References Cited

U.S. PATENT DOCUMENTS

| | | | |
|---|---|---|---|
| 3,761,395 A * | 9/1973 | Child et al. | 208/89 |
| 3,770,658 A * | 11/1973 | Ozaki et al. | 502/178 |
| 3,775,300 A * | 11/1973 | Hayes | 208/139 |
| 3,796,764 A * | 3/1974 | Suggitt et al. | 585/264 |
| 3,840,608 A * | 10/1974 | Suggitt et al. | 585/267 |
| 4,327,190 A * | 4/1982 | Ball et al. | 518/714 |
| 4,956,330 A | 9/1990 | Elliott et al. | |
| 5,536,693 A * | 7/1996 | Lemanski et al. | 502/300 |
| 5,550,281 A * | 8/1996 | Cirjak et al. | 560/245 |
| 5,665,667 A * | 9/1997 | Lemanski et al. | 502/300 |
| 5,830,425 A | 11/1998 | Schneider et al. | |
| 5,895,772 A * | 4/1999 | Grigorova et al. | 502/304 |
| 6,057,260 A * | 5/2000 | Nicolau et al. | 502/331 |
| 6,395,676 B2 * | 5/2002 | Blum et al. | 502/330 |
| 6,500,781 B2 | 12/2002 | Luo et al. | |
| 7,238,222 B2 | 7/2007 | Peterson | |
| 7,238,333 B2 * | 7/2007 | Faur-Ghenciu et al. | 423/247 |
| 7,268,333 B2 | 9/2007 | Kohno et al. | |
| 7,271,126 B2 * | 9/2007 | Smith et al. | 502/326 |
| 7,585,477 B2 * | 9/2009 | Nakatsuji et al. | 423/213.2 |
| 7,670,987 B2 * | 3/2010 | Kawashima et al. | 502/324 |
| 7,744,849 B2 | 6/2010 | Hagemeyer et al. | |
| 7,824,455 B2 * | 11/2010 | Faur-Ghenciu et al. | 48/198.3 |
| 7,857,981 B2 * | 12/2010 | Corma Canos et al. | 210/757 |
| 7,923,407 B2 * | 4/2011 | Goto | 502/327 |
| 8,003,565 B2 * | 8/2011 | Hagemeyer et al. | 502/326 |
| 8,119,558 B2 * | 2/2012 | Wagner et al. | 502/241 |
| 8,445,402 B2 * | 5/2013 | Shore et al. | 502/331 |
| 8,507,404 B2 * | 8/2013 | El-Malki et al. | 502/302 |
| 2002/0037938 A1 | 3/2002 | Luo et al. | |
| 2004/0184986 A1 | 9/2004 | Hagemeyer et al. | |
| 2005/0191224 A1 | 9/2005 | Endou | |
| 2005/0207958 A1 | 9/2005 | Faur-Ghenciu et al. | |
| 2006/0002848 A1 | 1/2006 | Tonkovich et al. | |
| 2011/0247493 A1 | 10/2011 | Hatscher | |
| 2011/0268649 A1 | 11/2011 | Henze et al. | |
| 2011/0274613 A1 | 11/2011 | Henze et al. | |

FOREIGN PATENT DOCUMENTS

| | | |
|---|---|---|
| EP | 1571125 A2 | 9/2005 |
| EP | 1908517 A1 | 4/2008 |
| JP | 2006181473 A | 7/2006 |
| WO | WO-2005/072871 A1 | 8/2005 |

OTHER PUBLICATIONS

International Written Opinion from PCT/IB2011/053729 dated Jan. 19, 2012.
U.S. Appl. No. 13/140,072, filed Jun. 16, 2011, Hatscher.
U.S. Appl. No. 13/142,786, filed Aug. 29, 2011, Henze et al.
U.S. Appl. No. 13/142,462, filed Sep. 28, 2011, Henze et al.

* cited by examiner

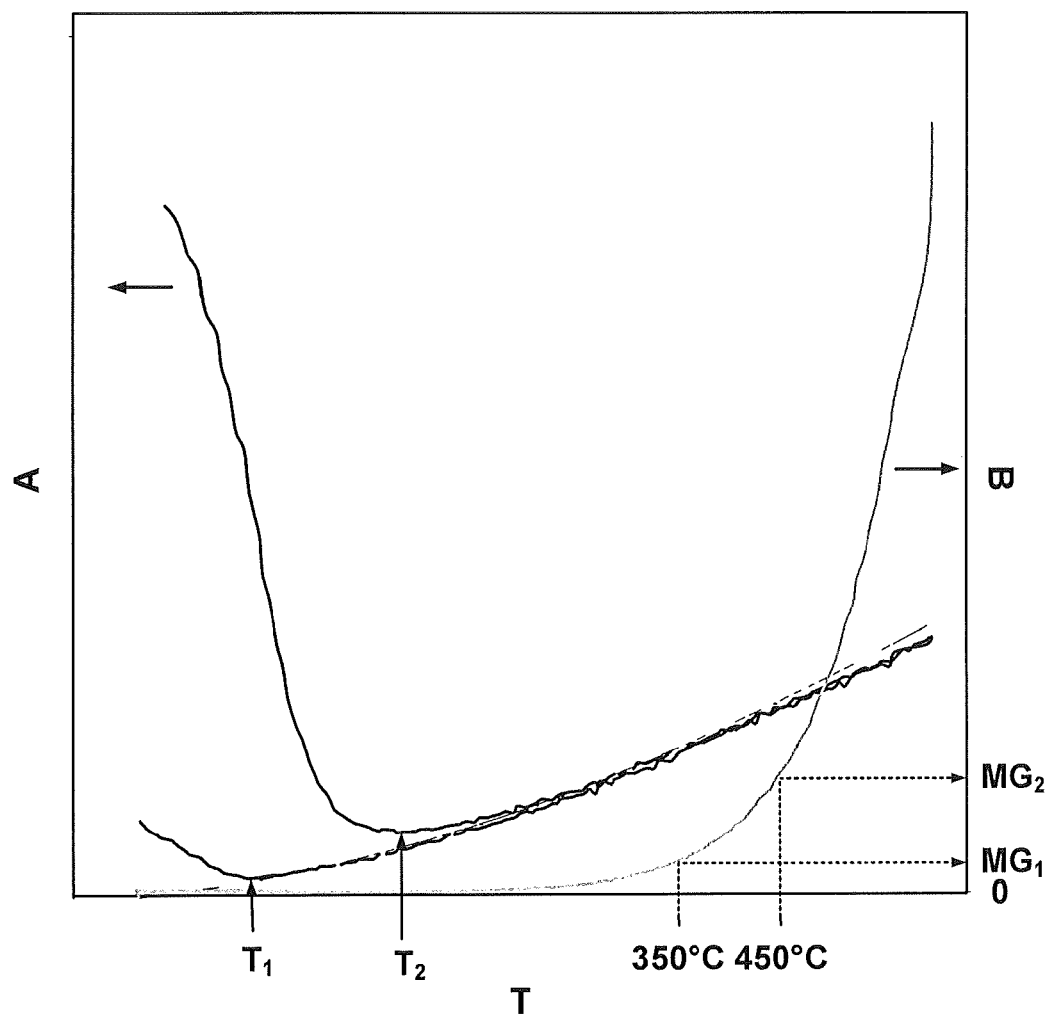

HIGHLY ACTIVE SHIFT CATALYSTS

CROSS-REFERENCE TO RELATED APPLICATIONS

This application claims benefit (under 35 USC 119(e)) of U.S. Provisional Application 61/377,107, filed Aug. 26, 2010 which is incorporated by reference.

BACKGROUND OF THE INVENTION

The present invention relates to a highly active water gas shift catalyst and a process for producing it, and also a process for converting a gas mixture comprising at least carbon monoxide and water into hydrogen and carbon dioxide in a wide temperature range using this catalyst.

In a fuel cell, electric energy is obtained by means of chemical reaction. Most fuel cells utilize the reaction of a reducing stream with an oxidizing stream, usually hydrogen and oxygen. To make a fuel usable in a fuel cell, this has to be converted beforehand into a hydrogen-rich stream.

The preliminary processing of fuels is often carried out in three steps:

The fuel is firstly reformed and in this way dissociated into CO and $H_2$. This is followed by a water gas shift stage in which the CO formed is reacted with water in a temperature-dependent equilibrium reaction to give $CO_2$ and $H_2$:

$$CO+H_2O \rightarrow CO_2+H_2$$

This equilibrium lies more to the side of $H_2$ and $CO_2$, the lower the temperature. A CO fine purification stage usually follows.

High concentrations (greater than 50 ppm) of CO damage the anode of the fuel cells. The CO content therefore has to be minimized before the actual cell. This is carried out in the water gas shift stage and also in the CO fine purification stage. The water gas shift stage usually occurs in two temperature stages. A reaction at temperatures in the range from 150° C. to 280° C. is referred to as a low-temperature shift reaction (LTS). The LTS is usually carried out catalytically using Cu/Zn oxide catalysts. In the range from 280° C. to 550° C., the reaction is referred to as a high-temperature shift reaction (HTS). This is traditionally carried out over Fe/Cr catalysts. This reaction can also be catalyzed by Mo, Ni and further elements. Noble metals on cerium oxides have likewise been described a number of times as catalysts for this reaction.

The shift reaction not only leads to removal of the catalyst poison CO but also increases the proportion of the desired product $H_2$ in the fuel stream. It is therefore important that a catalyst for the HTS catalyzes the production of $H_2$ from CO and $H_2O$ but does not catalyze reactions which lead to elimination or depletion of the desired product $H_2$. Such reactions include, in particular, methanation which can be observed over nickel catalysts at high temperatures and over noble metal catalysts even at temperatures above 350° C. This involves two reaction paths:

$$CO+3H_2 \rightarrow CH_4+H_2O$$

$$CO_2+4H_2 \rightarrow CH_4+2H_2O$$

Both reactions consume the desired product $H_2$ and therefore reduce the hydrogen yield.

Processes and catalysts which give a very high yield of hydrogen and display a very low tendency for methanation to occur are known from the prior art.

EP 1 571 125 A2 discloses a catalyst for separating carbon monoxide from hydrogen gas. This comprises an oxidic support material comprising zirconium dioxide, titanium dioxide, aluminum oxide, silicon dioxide, silicon dioxide-aluminum oxide, zeolites and cerium oxide. Platinum is present as catalytically active metal. Furthermore, alkali metals such as lithium, sodium, potassium, rubidium or cesium can be present as further inorganic compounds so as to improve the activity of the catalyst for removing carbon monoxide by conversion into carbon dioxide in the water gas shift reaction. The catalytically active metal is, according to EP 1 571 125 A2, present in the catalyst in an amount of 2% by weight.

WO 2005/072871 A1 discloses a catalyst for the water gas shift reaction which comprises metallic particles and particles of metal oxide. Suitable metal oxides are, for example, cerium oxide, titanium dioxide, iron oxide, manganese oxide or zinc oxide. Suitable metal particles are, for example, gold or platinum and are present in an amount of from 0.5 to 25% by weight, based on the oxidic material.

US 2006/0002848 A1 discloses a catalyst which has a support material composed of, for example, aluminum oxide, titanium dioxide, silicon dioxide, zirconium dioxide or a combination thereof. Furthermore, alkali or alkaline earth metals and also metals selected from among lead, bismuth, polonium, magnesium, titanium-vanadium-chromium, manganese iron, nickel or cobalt, etc., can be present. Catalytically active metals present are, for example, platinum, palladium, copper, rhodium, etc.

EP 1 908 517 A1 discloses a catalyst for converting $H_2O$/carbon monoxide into hydrogen and the use of this catalyst for increasing the concentration of hydrogen in a stream used for supplying a fuel cell. This catalyst is a solid comprising an active phase comprising elements of group VIII on a support material comprising aluminum oxide, silicon dioxide, zirconium dioxide or mixtures thereof and a promoter from the group of the rare earths, for example lanthanum or cerium.

US 2005/0207958 A1 discloses a process for reducing the amount of carbon monoxide in a water gas shift reactor without formation of methane. A catalyst having a support material based on cerium oxide and zirconium oxide or cerium oxide and lanthanum oxide is used for this purpose. As promoters to avoid methanation, use is made of copper, manganese, iron compounds or combinations. Further promoters can be alkali or alkaline earth metals. The amount of platinum present on the catalyst is at least 1% by weight.

US 2005/0191224 A1 discloses a catalyst for separating off carbon monoxide from hydrogen gas. The catalyst used for this purpose has a support composed of metal oxide and has a platinum component and an alkali metal applied to this support. According to this document, zirconium dioxide, titanium dioxide, aluminum oxide, silicon dioxide, silicon dioxide-aluminum oxide, zeolites or cerium oxide, for example, are suitable as support material.

A SUMMARY OF THE INVENTION

It was therefore an object of the invention to find an active catalyst which can be used over a wide temperature range and forms little methane. The catalyst should ideally have a low noble metal input.

Catalysts comprising noble metals are produced either by impregnating a shaped support material with metal salt solutions of the noble metal component or by impregnating the support powder and subsequently shaping it. It was therefore a further object of the invention to provide a process in which very little noble metal component is deposited in places inaccessible to the reaction.

The objects are achieved according to the invention by a catalyst comprising at least one noble metal in an amount of from 0.001 to 1.10% by weight, based on the total weight of the catalyst, at least one alkali metal and/or alkaline earth metal and at least one dopant selected from the group consisting of Fe, Cr, Cu, Zn and mixtures thereof on a support material.

The present invention further comprises a process for producing such a catalyst and also a process for converting a gas mixture comprising at least carbon monoxide and water into hydrogen and carbon dioxide using such a catalyst.

A BRIEF DESCRIPTION OF THE DRAWINGS

FIG. 1 shows an illustrative measurement scheme according to the invention

A DETAILED DESCRIPTION OF THE INVENTION

The embodiments of the present invention may be found in the claims, the description and the examples. It goes without saying that the abovementioned features and the features still to be explained below of the subject matter of the invention can be used not only in the combinations indicated in each case but also in other combinations without going outside the scope of the invention.

It has surprisingly been found that when a supported noble metal catalyst which has at least one noble metal in an amount of from 0.001 to 1.10% by weight, based on the total weight of the catalyst, at least one alkali metal and/or alkaline earth metal and at least one dopant selected from the group consisting of Fe, Cr, Cu, Zn and mixtures thereof on a support material is used, the water gas shift reaction can be carried out successfully in a wide temperature range and undesirable methanation is suppressed, particularly at elevated temperatures as occur in the HTS. It is precisely the combination of features of the catalyst of the invention which gives the advantages mentioned.

It is known that an increase in the shift activity combined with an increased tendency for methanation to occur is brought about in a noble metal-comprising shift catalyst by addition of, for example, sodium. A reduction in the shift activity combined with a decreased tendency for methanation to occur is brought about by addition of, for example, iron. For this reason, an optimum has to be found between addition of, for example, iron and alkali metal which both gives a satisfactory shift activity and suppresses the tendency for methanation to occur to a sufficient extent.

The catalyst of the invention comprises at least one noble metal and at least one alkali metal and/or alkaline earth metal, in each case in specified amounts, and also a dopant comprising at least one element selected from the group consisting of Fe, Cr, Cu, Zn and mixtures thereof on a support material.

The at least one noble metal is preferably selected from the group consisting of Au, Pt, Pd, Rh and Ru. Particular preference is given to using Pt. Combinations of Pt with one or more of the noble metals mentioned or combinations of one or more of the noble metals mentioned without Pt are also advantageous.

The present invention particularly preferably provides the catalyst according to the invention in which the noble metal is selected from the group consisting of Au, Pt, Pd, Rh, Ru and mixtures thereof. Very particular preference is given to using Pt as noble metal; in particular, Pt is preferably present as sole noble metal on the catalyst of the invention.

The concentration of the at least one noble metal is, according to the invention, advantageously from 0.001 to 1.10% by weight, preferably from 0.01 to 1.00% by weight, particularly preferably from 0.1 to 0.99% by weight, for example from 0.1 to 0.96% by weight, in each case based on the total weight of the catalyst. The specific combination of features of the catalyst of the invention makes it possible to use very small amounts of expensive noble metal and nevertheless achieve a high catalytic activity.

According to the invention, Li, Na, K, Rb, Cs, Mg, Ca and/or Sr are preferably used as at least one alkali metal and/or alkaline earth metal. Particular preference is given to Li, Na, K and Rb, in particular Na or K.

The present invention therefore particularly preferably provides the catalyst of the invention in which the alkali metal and/or alkaline earth metal is selected from the group consisting of Li, Na, K, Rb, Cs, Mg, Ca, Sr and mixtures thereof.

In a preferred embodiment, the concentration of the at least one alkali metal and/or alkaline earth metal is from 1.0 to 4.0% by weight, particularly preferably from 1.2 to 4.0% by weight, very particularly preferably from 1.8 to 3.5% by weight, in particular from 2.0 to 3.2% by weight, in each case based on the total weight of the catalyst. In a further preferred embodiment, from 1.2 to 3.5% by weight, based on the total weight of the catalyst, of K or Na is used.

The present invention therefore provides, in a preferred embodiment, the catalyst of the invention in which the at least one alkali metal and/or alkaline earth metal is present in an amount of from 1.0 to 4.0% by weight, based on the total catalyst.

As further component, the catalyst of the invention comprises at least one dopant selected from the group consisting of Fe, Cr, Cu, Zn and mixtures thereof. Very particular preference is given, according to the invention, to using iron as dopant. In particular, exclusively Fe is used as dopant.

In the catalyst of the invention, the at least one dopant, in particular iron, is present in a concentration of generally from 0.01 to 5% by weight, preferably from 0.05 to 2.5% by weight, particularly preferably from 0.1 to 1.5% by weight, in each case based on the total weight of the catalyst.

Apart from the at least one alkali metal and/or alkaline earth metal and the at least one dopant, the catalyst of the invention can comprise further dopants, for example rare earth metals and/or main group elements of groups 13 to 15. Such further dopants can have total concentrations of not more than 15% by weight.

Suitable support materials for the purposes of the invention are all materials which can customarily be used for these purposes in catalyst chemistry and have a sufficiently high BET surface area.

The BET surface area should advantageously be at least 50 $m^2/g$.

Preference is given to using support materials comprising combinations of lanthanide oxides and transition metals, particularly preferably Ce/Zr oxide. Here, the ratio of Ce oxide to Zr oxide should advantageously be 15-25:85-75% by weight, in each case based on the total weight of the support material. In an advantageous embodiment, the Ce/Zr oxide support material contains further oxides as dopants, for example $Al_2O_3$ and/or La oxide. For example, a ratio of $Al_2O_3$ to Ce/Zr oxide which is preferred according to the invention is 5-20: 95-80, particularly preferably 8-12:92-88, for example 10:90.

The amount of La oxide ($La_2O_3$) can be, for example, from 1 to 10% by weight, preferably from 3 to 8% by weight, particularly preferably from 4 to 6% by weight, in each case based on the total weight of the support material.

The present invention therefore particularly preferably provides the catalyst of the invention in which the support material comprises at least Ce and/or Zr. In a preferred embodiment, the present invention provides the catalyst of the invention in which the support material additionally comprises La and/or Al.

In a particularly preferred embodiment, the present invention provides the catalyst of the invention in which Pt is present as noble metal, the alkali metal and/or alkaline earth metal is selected from among Li, Na, K, Rb, Cs, Mg, Ca, Sr and mixtures thereof, the dopant is Fe and a support material comprising Ce and/or Zr is present. The present invention particularly preferably provides this catalyst according to the invention in which the support material additionally comprises La.

According to the invention, the components present or optionally present in the catalyst of the invention, i.e. the abovementioned noble metals, alkali metals and/or alkaline earth metals, dopants and support materials can be present in elemental and/or oxidic form.

In a further preferred embodiment, the present invention provides the catalyst according to the invention in which the at least one noble metal, in particular Pt, is present in an amount of from 0.001 to 1.10% by weight, preferably from 0.01 to 1.00% by weight, particularly preferably from 0.1 to 0.99% by weight, for example from 0.1 to 0.96% by weight, the at least one alkali metal and/or alkaline earth metal, in particular Na or K, is present in an amount of from 1.2 to 4.0% by weight, preferably from 1.8 to 3.5% by weight, particularly preferably from 2.0 to 3.2% by weight, and the at least one dopant, in particular Fe, is present in an amount of from 0.05 to 2.5% by weight, particularly preferably from 0.1 to 1.5% by weight, in each case based on the total weight of the catalyst, and the support material comprises at least Ce and/or Zr.

Very particularly preferred embodiments of the present invention comprising specific combinations of noble metal, alkali metal and/or alkaline earth metal, dopant and support material are disclosed in the examples.

It is precisely the combination according to the invention of noble metal, alkali metal and/or alkaline earth metal, dopant and support material, especially in combination with the specified amounts, which give a catalyst which, when used in a shift reaction, displays a very high reactivity combined with a very high efficiency. The high reactivity of the catalysts of the invention can be shown, for example, by the fact that the aforesaid shift reaction takes place with virtually complete thermodynamically possible conversion even at a relatively low temperature. Furthermore, the particularly high efficiency of the catalyst of the invention can be shown by the fact that the catalyst displays only a small tendency for methanation to occur in the shift reaction, i.e. only a small proportion of the hydrogen formed is reacted by formation of methane.

It goes without saying that the abovementioned features and features still to be indicated below of the catalyst can be employed not only in the combinations and value ranges indicated but also in other combinations and value ranges within the boundaries of the main claim without going outside the scope of the invention.

The catalyst of the invention can be produced by impregnation of the support material with the individual components. In a further advantageous production variant, the active components are applied to pulverulent support material which is then at least partly kneaded and extruded. It is also possible to combine the production variants with one another and, for example, apply only part of the active components to the pulverulent support material, knead and extrude the latter and then apply the remaining active components or the remaining partial amounts thereof.

The active components are preferably used in the form of their salts or their oxides. Salts which are suitable for the purposes of the invention are, for example, oxides, nitrates, hydroxides, acetates, acetylacetonates, carbonates, nitrosyl nitrates or halides such as fluorides, chlorides, bromides and iodides.

To ensure good accessibility of the noble metal, the components are, in an advantageous embodiment, applied onto the support material. Since various metal salts can usually not be applied in parallel due to conditions which have to be adhered to, for example pH, concentrations, etc., a catalyst having various promoters is often but not exclusively produced in a plurality of impregnation steps, for example two impregnation steps, which are carried out in succession.

The introduction of the active component by application to the support material can be carried out in a conventional way, e.g. as washcoat on a monolith.

If, according to further advantageous embodiments, the active material is firstly applied at least partly to the support material, preferably pulverulent support material, and then kneaded and subsequently extruded, the kneading and extrusion of the support material with the active compositions can be carried out in a conventional way using known apparatuses.

The present invention therefore provides, in particular, a process for producing the catalyst of the invention, wherein the at least one noble metal, the at least one alkali metal and/or alkaline earth metal and the at least one dopant are applied as solution or dispersion to the support material
or
part or all of the at least one noble metal, the at least one alkali metal and/or alkaline earth metal and/or the at least one dopant is applied as solution or dispersion to a support material and this support material is mixed with the remaining part of the components.

Contrary to the assumption that the relative activity should be lower in the case of a directly kneaded catalyst because of the homogeneous distribution of the active components over the entire volume of the catalyst particles compared to a catalyst having the same active composition but produced by impregnation, a similar activity has been found according to the present invention.

The production of shaped bodies from pulverulent raw materials can be carried out by conventional methods known to those skilled in the art, for example tableting, aggregation or extrusion, as described, inter alia, in Handbook of Heterogeneous Catalysis, Vol. 1, VCH Verlagsgesellschaft Weinheim, 1997, pages 414-417.

Auxiliaries known to those skilled in the art, e.g. binders, lubricants and/or solvents, can be added during shaping or application.

The production processes described are simple and inexpensive. The catalyst of the invention is highly active in respect of the shift reaction but suppresses the methanation reaction; for example, a methane content of less than 100 ppm, preferably less than 50 ppm (in each case at 350° C.) and less than 500 ppm, preferably less than 300 ppm (in each case at 450° C.) is achieved using the catalyst of the invention.

The catalyst described can be used in the process of the invention for converting a gas mixture comprising at least carbon monoxide and water into hydrogen and carbon dioxide.

The process can be carried out under the usual conditions of a shift reaction, both in the LTS range at temperatures of usually 150-280° C. and in the HTS range at temperatures of usually 280-550° C.

Owing to the low tendency for methanation to occur when the catalyst of the invention is used, even at high temperatures, this catalyst is particularly useful for the HTS in which the previous catalysts of the prior art are unsuitable. The shift reaction according to the invention proceeds particularly successfully in a temperature range from 180 to 550° C. It is therefore possible and advantageous to use the catalyst of the invention both in the stage of the HTS and in the stage of the LTS.

The catalyst of the invention also allows a reduction to only one shift stage which can then be carried out at a moderate temperature, for example from 230° C. to 450° C., since the high activity of the catalyst at low temperatures still allows good conversions.

The process of the invention for reducing the concentration of carbon monoxide (CO) by the process of a shift reaction over the highly active shift catalyst of the invention is carried out in conventional apparatuses and under customary conditions for carrying out a shift reaction, as are described, for example, in Handbook of heterogeneous catalysis, 2nd edition, Vol. 1, VCH Verlagsgesellschaft Weinheim, 2008, pages 354-355, and with a process gas comprising CO and water being passed over the catalyst.

The process gas used is a gas mixture which usually comprises further gases, e.g. hydrogen, carbon dioxide and nitrogen, in addition to the carbon monoxide and hydrogen which are reacted in the shift reaction described.

The present invention therefore also provides for the use of the catalyst of the invention for converting carbon monoxide and water into carbon dioxide and hydrogen.

Furthermore, the present invention provides a process for converting a gas mixture comprising at least carbon monoxide and water into carbon dioxide and hydrogen using a catalyst according to the invention.

FIGURE

FIG. 1 shows an illustrative measurement scheme. Here, the abbreviations have the following meanings:
A amount of CO at the reactor outlet in ppm
B methane content in ppm
T temperature in ° C.
$MG_1$ methane content at 350° C. in ppm
$MG_2$ methane content at 450° C. in ppm The invention is illustrated by the following examples without these examples constituting any restriction:

EXAMPLES

Catalysts according to the invention and catalysts serving as comparison are produced by the following methods:
1. Production by Impregnation (I):
The catalysts according to the invention and the comparative catalysts can be produced by impregnation, as is shown by the following example of the production of a catalyst:
Starting Materials:

| Ce/Zr oxide extrudates 1.5 mm (water uptake (WU): 0.34 cm$^3$/g) | 1040 g |
| Pt nitrate solution $w_{Pt}$: 12.9%) | 83 g |
| Fe(NO$_3$)$_3$ × 9H$_2$O ($w_{Fe2O3}$: 19.88%) | 15 g |
| KOH 40% strength ($w_{K2O}$: 33.68%) | 72 g |

Procedure:
The required amount of iron nitrate is dissolved in the indicated amount of platinum nitrate solution and diluted with distilled H$_2$O to a volume corresponding to 90% of the water uptake of the Ce/Zr support material. The extrudates are placed in a vessel and spray-impregnated with the platinum/iron nitrate solution with circulation. After impregnation, the extrudates are circulated for a further 5 minutes, then dried and subsequently calcined. In the next preparation step, potassium hydroxide solution is diluted with distilled H$_2$O to a volume corresponding to 90% of the water uptake of the Pt/Fe-doped extrudates obtained. These extrudates are subsequently spray-impregnated with the dilute potassium hydroxide solution obtained with continual circulation. After impregnation, the extrudates are again circulated for a further 5 minutes, then dried and subsequently calcined.
Drying: 4 h at 200° C. in a convection drying oven
Calcination: 2 h at 500° C.
Weight of product: 1001.8 g
Doping obtained: 0.9 g of Pt/100 g of catalyst
   0.2 g of Fe/100 g of catalyst
   2.0 g of K/100 g of catalyst
2. Production by Kneading (K):
The catalysts according to the invention and the comparative catalysts can be produced by kneading, as is shown by the following example of the production of a catalyst:
Starting Materials:

| Ce/Zr oxide - Extrudates 1.5 mm (water uptake (WU): 0.34 cm$^3$/g) | 155 g |
| Pural SB | 22 g |
| Platinum nitrate solution ($w_{PtO}$: 14.02%) | 13 g |
| Fe(NO$_3$)$_3$ × 9H$_2$O ($w_{Fe2O3}$: 19.88%) | 2.5 g |
| KOH 40% strength ($w_{K2O}$: 33.68%) | 6.1 g |
| HNO$_3$ 65% strength | 7.1 g |

Procedure: The Ce/Zr oxide powder is placed together with the Pural SB in a kneader. The nitric acid diluted with distilled H$_2$O to a total volume of 20 ml is slowly added and the mixture is kneaded for 10 minutes. The iron nitrate is subsequently dissolved in the platinum nitrate solution, diluted with distilled H$_2$O to a total volume of 30 ml, added and the mixture is kneaded for another 5 minutes. The undiluted potassium hydroxide solution is subsequently added and the mixture is kneaded for another 10 minutes. Distilled H$_2$O is added in small portions until a plastic composition is formed. The plastic composition is shaped by means of an extruder to give 1.5 mm extrudates.
Total consumption of distilled H$_2$O: 69 ml (comprises the distilled H$_2$O for diluting the HNO$_3$ and the Pt/Fe solution)
Pressing pressure: 60 bar
Kneading time: 49 minutes
Drying: 4 hours at 200° C. in a convection drying oven
Calcination: 2 hours at 500° C. in a convection furnace
Doping obtained: 0.9 g of Pt/100 g of catalyst
   0.2 g of Fe/100 g of catalyst
   1.0 g of K/100 g of catalyst
3. Testing of the Catalysts:
To demonstrate the suitability of the catalysts produced, these are used in a shift reaction. Testing is carried out as follows:
1. Catalyst installation: 15 ml of catalyst (bed) or from 8 to 12 ml (volume of a monolith) are installed in the reactor,
2. Testing that the total apparatus is free of leaks after installation of the catalyst and before start-up,
3. Heating to 220° C. and simultaneous reduction of the catalyst using a 1:1 mixture of H$_2$ and N$_2$, 4. On reaching a temperature of 220° C., this is maintained for 5 minutes and the test is then started,
5. Start data recording,
6. Start temperature program, i.e. heat from 220° C. to 450° C. in 600 minutes (cont.),
7. Maintain at 450° C. for 20 minutes,
8. Cooling from 450° C. to 220° C. in 600 minutes (cont.).

The composition of the reaction gas used for testing is:
7% by weight of CO,
7% by weight of $CO_2$,
33% by weight of $H_2$,
27% by weight of $N_2$ and
26% by weight of $H_2O$ The GHSV over the catalyst is 12279/h during testing. This test variant will hereinafter be referred to as test method M.

As an alternative to this test method M, it is possible, for example, to change the temperature program, for example by reducing the final temperature to 380° C. at an initial temperature and heating rate (° C./min) which are unchanged from method M.

The following apparatuses are used:
Heating: Convection furnace with temperature range up to max. 600° C.,
Temperature measurement against the outside of the reactor,
Gas metering: Mass flow controller (Brooks)
Water metering: Liquid flow
Analytical instrument for CO and $CO_2$: Siemens Ultramat 23
Analytical instrument for methane: FID from J.U.M. Engineering Model 3-300A
Pressure regulation by means of Reco pressure regulating valve
Linseis 36 channel recorder as interface for data storage
Data evaluation by Software The following parameters are measured:
1. Temperature $T_1$ (temperature with the lowest CO content at the beginning of the first ramp [° C.])
2. Temperature $T_2$ (temperature with the lowest CO content after the first temperature ramp [° C.])
3. Methane content $MG_1$ in ppm at a temperature of 350° C.
4. Methane content $MG_2$ in ppm at a temperature of 450° C.
5. Method M (ramp from 220 to 440° C., Chevron etc.)

4. Results

The results for the catalysts according to the invention and the catalysts produced for comparison are shown in Table 1 below:

TABLE 1

Results of the various catalysts according to the invention and the catalysts for comparison

| No. | Pt [% by weight] | Doping[1] | Alkali metal/alkaline earth metal[2] | Production[3] | $T_1$ [° C.] | $T_2$ [° C.] | $MG_1$ [ppm] | $MG_2$ [ppm] | M |
|---|---|---|---|---|---|---|---|---|---|
| 1 | 0.95 | Fe; 0.2 | K; 2 | I | 260.8 | 301.18 | 30.62 | 278.5 | x |
| 2 | 0.95 | Fe; 0.2 | K; 1 | K | 260 | 300 | 71.33 | — | only 380° C. |
| 3 | 0.9 | Fe; 0.2 | K; 1 | K | 270 | 305 | 67.39 | — | only 380° C. |
| 4 | 0.8 | Fe; 0.2 | K; 1 | K | 280 | 310 | 54.49 | — | only 380° C. |
| 5 | 0.9 | Fe; 0.2 | K; 2 | K | 292.44 | 345.22 | 28.66 | 145.54 | x |
| 6 | 0.35 | Fe; 0.2 | K; 2 | I | 320 | 325 | 19.67 | 285.33 | x |
| C7[4] | 0.35 | Fe; 0.07 | K; 0.7 | I | 330 | 345 | 180.69 | 1383.89 | x |
| 8 | 0.95 | Fe; 0.3 | K; 2 | I | 268.66 | 280.96 | 48.62 | 216.3 | x |
| 9 | 0.95 | Fe; 0.4 | K; 2 | I | 285.22 | 314 | 17.77 | 101.96 | x |
| 10 | 0.95 | Fe; 0.25 | K; 2 | K | 286.29 | 293.57 | 45.27 | — | x |
| 11 | 0.95 | Fe; 0.15 | K; 2 | K | 284.81 | 285.2 | 68.98 | — | only 380° C. |
| 12 | 0.95 | Fe; 0.2 | K; 3 | I | 262.48 | 321.29 | — | — | only 380° C. |
| C13[4] | 0.95 | Fe; 0.2 | — | I | 282.23 | 307.46 | 291.56 | 1885.45 | x |
| C14[4] | 0.95 | Fe; 0.5 | — | I | 296.27 | 319.63 | 77.23 | 329.51 | x |
| C15[4] | 0.95 | Fe; 0.8 | — | I | 315.15 | 351.55 | 68.31 | 246.63 | x |
| C16[4] | 0.95 | Fe; 1.0 | Na; 2 | I | 310.87 | 331.72 | 30.07 | 43.38 | x |
| 17 | 0.95 | Fe; 0.5 | Na; 2 | I | 310.38 | 343.08 | 54.52 | 208.73 | x |
| C18[4] | 0.95 | Fe; 1.0 | Na; 2 | K | 331.61 | 363.68 | 30.89 | 75.98 | x |
| C19[4] | 0.95 | — | K; 5 | I | 292.74 | 346.69 | 72.06 | 913.61 | x |
| C20[4] | 0.95 | Fe; 5 | Ni; 1 | I | 359.03 | 358.8 | 25698.78 | 32595.57 | x |
| 21 | 0.95 | Fe; 0.5 | Li; 2 | I | 285.63 | 297.78 | 104.51 | 786.67 | x |
| 22 | 0.95 | Fe; 0.5 | Rb; 2 | I | 293.08 | 304.74 | 52.34 | 179.14 | x |
| 23 | 0.95 | Fe; 0.5 | Cs; 2 | I | 259.89 | — | 109.03 | 554.88 | x |
| C24[4] | 0.95 | Mn; 0.2 | K; 2 | I | 276.89 | 314.25 | 291.41 | 4111.02 | x |
| C25[4] | 0.95 | Co; 0.2 | K; 2 | I | 304.19 | 318.84 | 590.55 | 4731.53 | x |
| 26 | 0.95 | Fe; 0.2 | Mg; 2 | I | 321.44 | 311.44 | 80.09 | 694.34 | x |
| 27 | 0.95 | Fe; 0.2 | Ca; 2 | I | 300.59 | 323.29 | 143.21 | 1194.77 | x |
| 28 | 0.95 | Fe; 0.2 | Cs; 2 | I | 293.18 | 294.92 | 178.32 | 1626.74 | x |
| 29 | 0.95 | Fe; 0.2 | K; 2 | I | 281.56 | 307.02 | — | — | x |
| 30 | 0.95 | Fe; 0.5 | K; 2 | I | 282.83 | 209.57 | 24.15 | 108.47 | x |
| C31[4] | 0.95 | Fe; 5 | — | I | 265.95 | 298.15 | 43.72 | 388.31 | x |

[1]element; Amount [% by weight] are reported
[2]element; Amount [% by weight] are reported
[3]I = impregnation; K = kneading
[4]comparative experiment

The invention claimed is:

1. A catalyst comprising at least one noble metal in an amount of from 0.1 to 0.96% by weight, based on the total weight of the catalyst, at least one alkali metal and/or alkaline earth metal and Fe as dopant, on a support material that includes both Ce oxide and Zr oxide, the Ce oxide present from 15% to 25% by weight and the Zr oxide is present from 85% to 75% by weight, based upon the weight of the support material, wherein the at least one alkali metal and/or alkaline earth metal is present in an amount of from 1.2 to 4.0% by weight, and the Fe is present from 0.1 to 0.5% by weight, based on the total weight of the catalyst.

2. The catalyst according to claim 1, wherein the noble metal is selected from the group consisting of Au, Pt, Pd, Rh, Ru and mixtures thereof.

3. The catalyst according to claim 2, wherein the support material has a BET surface area of at least 50 m$^2$/g.

4. The catalyst according to claim 1, wherein the alkali metal and/or alkaline earth metal is selected from the group consisting of Li, Na, K, Rb, Cs, Mg, Ca, Sr and mixtures thereof.

5. The catalyst according to claim 4, wherein the at least one noble metal is Pt.

6. The catalyst according to claim 1, wherein the support material further comprises La and/or Al.

7. The catalyst according to claim 1, wherein the at least one alkali metal and/or alkaline earth metal is present in an amount of from 1.8 to 3.5% by weight.

8. The catalyst according to claim 1, wherein the support material further includes $Al_2O_3$ or La oxide.

9. The catalyst according to claim 8, wherein the support includes $Al_2O_3$, the $Al_2O_3$ is present from 8% to 12% by weight, based upon the weight of the support material.

10. The catalyst according to claim 8, wherein the support includes La oxide, the La oxide is present from 3% to 8% by weight, based upon the weight of the support material.

11. A process for producing a catalyst according to claim 1, wherein the at least one noble metal, the at least one alkali metal and/or alkaline earth metal and the at least one dopant are applied as solution or dispersion to the support material or part or all of the at least one noble metal, the at least one alkali metal and/or alkaline earth metal and/or the at least one dopant is applied as solution or dispersion to a support material and this support material is mixed with the remaining part of the components.

12. A method for converting carbon monoxide and water into carbon dioxide and hydrogen which comprises utilizing the catalyst according to claim 1.

13. A process for converting a gas mixture comprising at least carbon monoxide and water into carbon dioxide and hydrogen which comprises utilizing the catalyst according to claim 1.

14. A catalyst comprising:
0.1 to 0.96% by weight of at least one noble metal, and 1.2 to 4.0% by weight of at least one alkali metal and/or alkaline earth metal, based on the total weight of the catalyst; and Fe as dopant, the Fe present from 0.1 to 0.5% by weight, based on the total weight of the catalyst;

wherein the at least one noble metal, the at least one alkali metal and/or alkaline earth metal selected from the group consisting of Li, Na, K, Rb, Cs, Mg, Ca, Sr and mixtures thereof, and the Fe is provided on a support material with a BET surface area of at least 50 m$^2$/g, and the support material comprises at least Ce oxide and/or Zr oxide, the Ce oxide present from 15% to 25% by weight, and the Zr oxide is present from 85% to 75% by weight, based upon the weight of the support material.

15. The catalyst according to claim 14, wherein the support includes $Al_2O_3$, the $Al_2O_3$ is present from 8% to 12% by weight, based upon the weight of the support material.

16. The catalyst according to claim 14, wherein the support includes La oxide, the La oxide is present from 3% to 8% by weight, based upon the weight of the support material.

* * * * *